United States Patent
Kohara

(10) Patent No.: US 8,760,441 B2
(45) Date of Patent: Jun. 24, 2014

(54) INFORMATION PROCESSING DEVICE

(75) Inventor: Genji Kohara, Osaka (JP)

(73) Assignee: KYOCERA Corporation, Kyoto (JP)

( * ) Notice: Subject to any disclaimer, the term of this patent is extended or adjusted under 35 U.S.C. 154(b) by 587 days.

(21) Appl. No.: 12/746,727

(22) PCT Filed: Dec. 9, 2008

(86) PCT No.: PCT/JP2008/072322
§ 371 (c)(1),
(2), (4) Date: Jun. 7, 2010

(87) PCT Pub. No.: WO2009/075260
PCT Pub. Date: Jun. 18, 2009

(65) Prior Publication Data
US 2010/0259515 A1      Oct. 14, 2010

(30) Foreign Application Priority Data

Dec. 13, 2007  (JP) ................................. 2007-322271

(51) Int. Cl.
*G09G 5/00*        (2006.01)
(52) U.S. Cl.
USPC ............. 345/204; 345/1.1; 345/1.3; 345/206; 345/209; 345/641
(58) Field of Classification Search
CPC .......... G06F 3/1438; G06F 2200/1614; G09G 2340/0464; G09G 2340/0492; H04M 1/0235; H04M 1/0266; H04M 2250/16
USPC ........... 345/1.1, 1.3, 102, 107, 156–184, 619, 345/641, 650, 204–213; 715/863, 740, 751; 455/566, 558; 361/679.27
See application file for complete search history.

(56) References Cited

U.S. PATENT DOCUMENTS 5,900,848 A     5/1999  Haneda et al.
6,321,671 B1 *  11/2001 Tomita ..................... 112/475.19
(Continued)

FOREIGN PATENT DOCUMENTS

JP    08-044672    2/1996
JP    09-305262    11/1997
(Continued)

OTHER PUBLICATIONS

PCT/JP2008/072322, PCT/ISA/210.
(Continued)

*Primary Examiner* — Prabodh M Dharia
(74) *Attorney, Agent, or Firm* — Procopio, Cory, Hargreaves & Savitch LLP

(57) ABSTRACT

An information processing device for processing various kinds of information such as a mobile phone that allows an operator facing the device and other persons to view images on display screens in an easy manner includes a CPU that determines if a mobile phone has entered a two-screen state in accordance with an ON signal from an opening sensor If the CPU determines the mobile phone has entered such a state, then the CPU determines whether "split-screen display" is preset by a user. If the CPU determines that "split-screen display" is set, a display control part sends image signals to a liquid crystal display and a liquid crystal display in accordance with this determination. Accordingly, a previously displayed image is displayed upside down on a first display screen, and the same image is displayed in a normal state (not upside down) on a second display screen.

18 Claims, 16 Drawing Sheets

(56) References Cited

U.S. PATENT DOCUMENTS

| | | | |
|---|---|---|---|
| 6,747,635 B2* | 6/2004 | Ossia | 345/169 |
| 7,532,196 B2* | 5/2009 | Hinckley | 345/156 |
| 7,821,780 B2* | 10/2010 | Choy | 361/679.06 |
| 7,884,807 B2* | 2/2011 | Hovden et al. | 345/173 |
| 2005/0093868 A1* | 5/2005 | Hinckley | 345/502 |
| 2005/0235215 A1* | 10/2005 | Dunn et al. | 715/740 |
| 2006/0034042 A1 | 2/2006 | Hisano et al. | |
| 2006/0183505 A1* | 8/2006 | Willrich | 455/566 |
| 2007/0002037 A1* | 1/2007 | Kuroki et al. | 345/418 |
| 2007/0171238 A1* | 7/2007 | Ubillos et al. | 345/648 |
| 2008/0165141 A1* | 7/2008 | Christie | 345/173 |
| 2008/0165152 A1* | 7/2008 | Forstall et al. | 345/173 |
| 2008/0284738 A1* | 11/2008 | Hovden et al. | 345/173 |
| 2009/0102744 A1* | 4/2009 | Ram | 345/1.1 |
| 2009/0198359 A1* | 8/2009 | Chaudhri | 700/94 |
| 2009/0295753 A1* | 12/2009 | King et al. | 345/174 |
| 2009/0296331 A1* | 12/2009 | Choy | 361/679.09 |
| 2011/0063322 A1* | 3/2011 | Takabayashi et al. | 345/619 |
| 2012/0223872 A1* | 9/2012 | Ram | 345/1.3 |
| 2013/0030831 A1* | 1/2013 | Powell et al. | 705/2 |

FOREIGN PATENT DOCUMENTS

| | | |
|---|---|---|
| JP | 2003-224632 | 8/2003 |
| JP | 2003-298700 | 10/2003 |
| JP | 2006-053678 | 2/2006 |
| KR | 100239012 B1 | 10/1999 |

OTHER PUBLICATIONS

Notification of Grounds for Rejection issued for counterpart Korean Patent Application No. 2010-7013068.

Notification of Reasons for Refusal issued in JP patent application No. 2007-322271, on Jul. 6, 2010, 5 pages.

International Preliminary Report on Patentability issued in PCT/JP2008/072322, on Jun. 24, 2010, 6 pages.

Translation of International Preliminary Report on Patentability issued in PCT/JP2008/072322, on Aug. 19, 2010, 6 pages.

Office Action dated Nov. 15, 2010 issued by the Japanese Patent Office for the corresponding Japanese Patent Application No. 2007-322271.

* cited by examiner

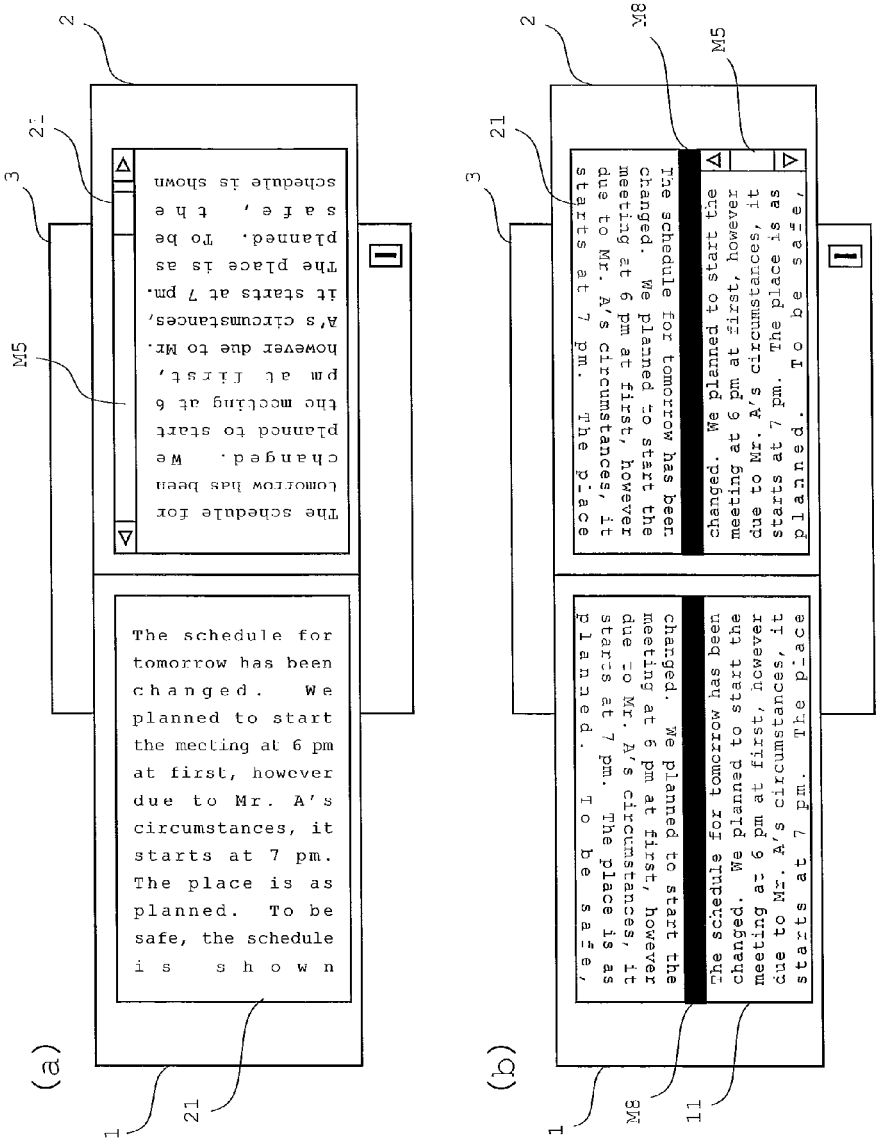

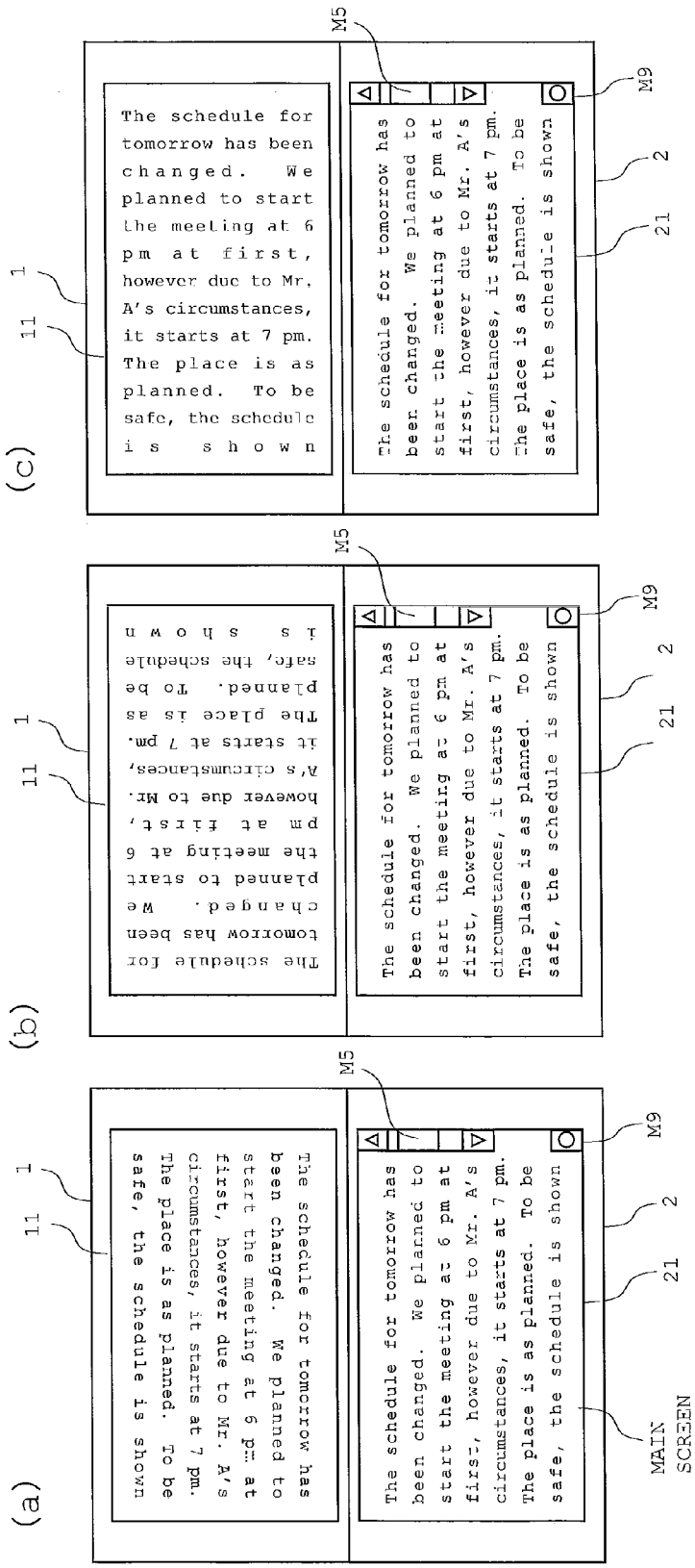

INFORMATION PROCESSING DEVICE

TECHNICAL FIELD

The present invention relates to an information processing device for processing various kinds of information such as a mobile phone.

BACKGROUND ART

In general, a mobile phone is provided with a display screen of a liquid crystal display on which an operation screen, e-mail text, television pictures, and others are shown. If such a display screen is large-sized, it is possible to display a great deal of information (such as document text) at a time and project television pictures in an enlarged size. On the other hand, with such a large-sized display screen, the entire device becomes increased in size and too bulky to carry.

In light of such a problem, there has been devised a mobile phone that includes: a first display screen which is exposed to the outside at all times; and a second display screen which is accommodated in a main body when the mobile phone is carried and which is exposed to the outside when the mobile phone is used, and that displays an image on one screen into which the first display screen and the second display screen are integrated. Such a mobile phone is disclosed in Patent Document 1, for example.

Patent Document 1: JP 2003-298700 A

DISCLOSURE OF THE INVENTION

Problem to be Solved by the Invention

If the display screen can be made larger as stated above, the mobile phone becomes increased in usage patterns. For example, the mobile phone may have an image displayed on the display screen, which conventionally is viewed only by one person, in such a manner that two persons situated on the sides of the mobile phone can view the image or several persons surrounding the mobile phone can view the image at the same time. In such cases, it is conceivable that several persons check the contents of transmitted e-mail, watch television pictures, and so on.

However, when being used in such cases as stated above, a conventional mobile phone requires person (s) other than an operator facing the mobile phone (the owner of the mobile phone) to view an image displayed upside down on the mobile phone. This causes a problem that the image is less easy to view.

The present invention solves the foregoing problem, and an object of the present invention is to provide an information processing device for processing various kinds of information such as a mobile phone that allows the operator facing the device and other person(s) to view images on a display screen of the device in an easy manner.

Means to Solve the Problem

In light of the foregoing problem, the present invention has characteristics as stated below.

An information processing device in a first aspect includes: a first display unit having a first display screen; a second display unit having a second display screen; a display control part for controlling displays on the first display unit and the second display unit; and a switch mechanism part for switching layouts of the first display unit and the second display unit between a first screen state in which only the first display screen is exposed to the outside and a second screen state in which both the first display screen and the second display screen are exposed to the outside, wherein the display control part includes a control process for changing an orientation of a displayed image in the second screen state.

According to the information processing device of the first aspect, since the orientation of a displayed image can be changed in the second screen state, it is possible to suit the orientation of the displayed image to an orientation of viewing of person(s) other than the operator. This allows the person(s) other than the operator to view the image in an easy manner.

In the information processing device of the first aspect, the display control part may be configured to allow either the first display screen or the second display screen to display an image in an orientation different from an orientation of display on the other display screen in the second screen state.

In such a manner as stated above, since an image is displayed on either the first display screen or the second display screen in an orientation different from the orientation of the other display screen, it is possible to suit the orientation of the image on either of the display screens to an orientation of viewing of person (s) other than the operator. This allows the person(s) other than the operator to view the image in an easy manner.

Further, in the information processing device of the first aspect, the display control part may be configured to execute a control process to change the orientation of the displayed image in accordance with a switching operation from the first screen state to the second screen state. For example, the display control part may be configured to execute a control process to change the orientation of the displayed image on the first display screen in accordance with a switching operation from the first screen state to the second screen state.

In such a manner as stated above, display orientation is changed in accordance with the switching operation from the first screen state to the second screen state, which eliminates the need to change the orientation at each switching to the second screen state, thereby resulting in improvement of operability.

Further, in the information processing device of the first aspect, the display control part may be configured to execute a control process to change the orientation of the displayed image in accordance with a switching operation from the outside in the second screen state.

As stated above, when the orientation of the image can be changed as appropriate in accordance with the operation, it is possible to adjust the orientation of the image in accordance with the orientation of viewing of the person (s) other than the operator, thereby offering the foregoing advantage in a smooth manner.

Further, in the information processing device of the first aspect, the display control part may be configured to allow images from the same information source to be displayed in different orientations on a plurality of display regions in the second screen state. In addition, when an operation for advancing the displayed images is input in this display state, the display control part controls the first display unit and the second display unit so as to synchronize image advancement between the display regions. At that time, the display control part may be configured to synchronize image advancement between the display regions by changing scroll speeds on the display regions. Alternatively, the display control part may be configured to control the first display unit and the second display unit in such a manner that: out of the display regions, until an end of a main image displayed on the largest display region is also displayed on all the other display regions, image advancement on the largest display region is stopped and image advancement on the other display regions is sequentially performed up to the end of the main image; and after the end of the main image is displayed on all the other display regions, an image following the main image is displayed on the display regions.

Accordingly, when the operator performs an operation for screen advancement, image advancement is synchronized between the display regions to thereby allow the operator and other person(s) to view the same images simultaneously and share information smoothly based on the displayed images.

A second aspect of the present invention is an information processing device including a display control means for controlling display of images on a first display unit having a first display screen and on a second display unit having a second display screen, wherein, when the information processing device makes a transition from a first screen state in which only the first display screen is exposed to the outside to a second screen state in which both the first display screen and the second display screen are exposed to the outside, the display control means changes an orientation of an image displayed on the first display screen.

A third aspect of the present invention is an information processing device including a display control means for controlling display of images on a first display unit having a first display screen and on a second display unit having a second display screen, wherein, when the information processing device makes a transition from a first screen state in which only the first display screen is exposed to the outside to a second screen state in which both the first display screen and the second display screen are exposed to the outside, the display control means allows an image displayed on the first display screen prior to the transition to be displayed on the second display screen, in an orientation different from a previous orientation of the image.

According to the information processing device of the second and third aspects, person (s) other than the operator are allowed to view a displayed image in an easy manner. In addition, display orientation is changed when the information processing device makes a transition from the first screen state to the second screen state, which eliminates the need to change display orientation at each switching to the second screen state, thereby resulting in improvement of operability.

According to the present invention as stated above, it is possible to provide an information processing device which allows the operator facing the device and other person(s) to view displayed images in an easy manner.

Advantage or significance of the present invention will be further understood from the description of an embodiment below. However, the following embodiments are merely examples for carrying out the present invention, and the present invention is not limited by the following embodiments.

BRIEF DESCRIPTION OF THE DRAWINGS

FIG. 15 is a diagram showing still another configuration of the mobile phone of the embodiment where the first display screen and the second display screen are aligned horizontally in the two-screen state; and FIG. 16 is a diagram showing a configuration of the mobile phone of the embodiment where an orientation of an image on the first display screen is switched by a user operation in the two-screen state.

However, the drawings are intended only for description and do not limit the scope of the present invention.

Best Mode for Carrying out the Invention

Embodiments of the present invention will be described below with reference to the attached drawings.

Figure 1:
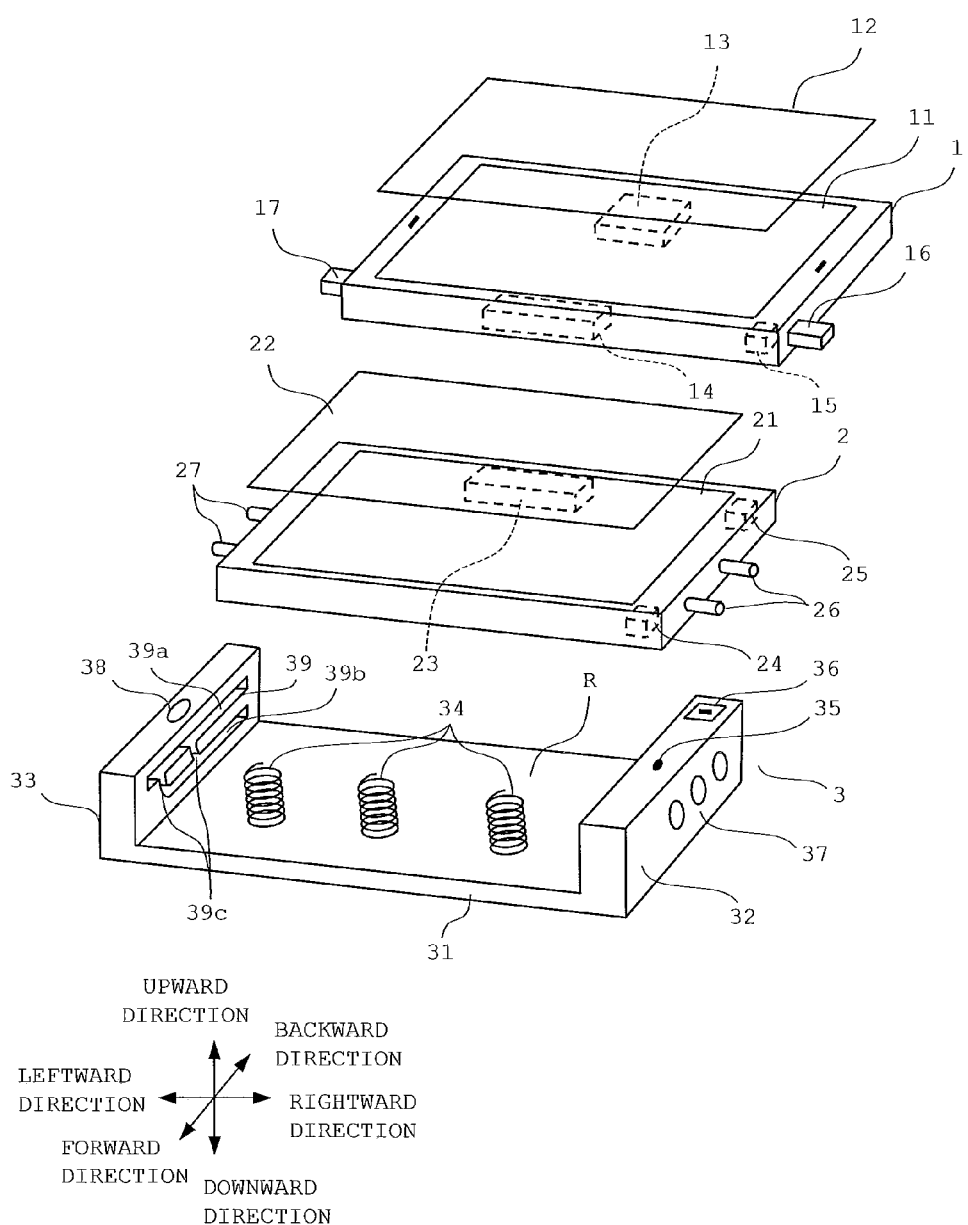
FIG. 1 is a diagram showing a configuration of a mobile phone of an embodiment.

FIG. 1 is a diagram (exploded perspective view) showing a configuration of a mobile phone as one embodiment of an information processing device in the present invention. The mobile phone is constituted by a first cabinet 1, a second cabinet 2, and a holding body 3 for holding the first and second cabinets 1 and 2.

The first cabinet 1 has the shape of a vertically-thin, horizontally-long rectangular parallelepiped. The first cabinet 1 contains a liquid crystal display (not shown) and has a first display screen 11 disposed on an upper surface thereof. The first cabinet 1 has a touch panel 12 attached on the first display screen 11. When a user presses any of various keys displayed on the first display screen 11, the touch panel 12 detects a pressed position and outputs a signal in accordance with the position (position signal).

The first cabinet 1 has a camera module 13 inside at a position slightly behind a center thereof. The first cabinet 1 has on a bottom surface thereof a lens window (not shown) for capturing an image of an object from the camera module 13. The first cabinet 1 also has a magnet 14 inside in a middle of vicinity of a front surface thereof and has a magnet 15 inside at a front right corner thereof. Further, the first cabinet 1 has projections 16 and 17 on right and left surfaces thereof, respectively.

The second cabinet 2 has the shape of a vertically-thin, horizontally-long rectangular parallelepiped. That is, the second cabinet 2 is almost the same in shape and size as the first cabinet 1. The second cabinet 2 contains a liquid crystal display (not shown) and has a second display screen 21 disposed on an upper surface thereof. The second display screen is identical in size to the first display screen 11. The second cabinet 2 has a touch panel 22 attached on the second display screen 21. When a user presses any of various keys displayed on the second display screen 21, the touch panel 22 detects a pressed position and outputs a signal in accordance with the position (position signal).

The second cabinet 2 has a magnet 23 inside in a middle of vicinity of a rear surface thereof. The magnet 23 and the first cabinet's magnet 14 are configured to attract each other when the first cabinet 1 and the second cabinet 2 are positioned so as to constitute a large-sized screen as stated later (the two-screen state). Alternatively, if either magnet of the first cabinet 1 or the second cabinet 2 is significantly large in magnetic force, the other magnet may be replaced with any magnetic material.

The second cabinet 2 has a closing sensor 24 inside at a front right corner thereof and has an opening sensor 25 at a back right corner thereof. The closing sensor 24 and the opening sensor 25 are constituted by hall ICs or the like, for example, and output detection signals in response to the magnets' magnetic force. As described later, when the first cabinet 1 and the second cabinet 2 are overlapped, the magnet 15 of the first cabinet 1 becomes closer to the closing sensor 24, and then the closing sensor 24 outputs an ON signal. Meanwhile, when the first cabinet 1 and the second cabinet 2 are aligned horizontally, the magnet 15 of the first cabinet 1 becomes closer to the opening sensor 25, and therefore the opening sensor 25 outputs an ON signal.

Further, the second cabinet 2 has two shaft parts 26 on a right surface thereof and has two shaft parts 27 on a left surface thereof.

The holding body 3 is constituted by a bottom plate part 31, a right holding part 32 formed at a right end of the bottom plate part 31, and a left holding part 33 formed at a left end of the bottom plate part 31. The first cabinet 1 and the second cabinet 2, in a vertically overlapping state, are accommodated in an accommodation region R surrounded by the bottom plate part 31, the right holding part 32, and the left holding part 33.

The bottom plate part 31 has three coil springs 34 arranged horizontally. When the second cabinet 2 is attached to the holding body 3, the coil springs 34 contact the bottom surface of the second cabinet 2 to thereby apply an upward pressing force to the second cabinet 2.

The right holding part 32 has a microphone 35 and a power button 36 on an upper surface thereof. In addition, the right holding part 32 has an operation button group 37 on an outer surface thereof. The operation button group 37 includes a plurality of operation buttons such as a manner-mode setting button. These operation buttons can be operated to perform certain functions without the need for manipulating the touch panels 12 and 22. The left holding part 33 has a speaker 38 on an upper surface thereof. A user uses the mobile phone to make a call with the left holding part 33 at his/her ear and the right holding part 32 at his/her mouth.

The right holding part 32 and the left holding part 33 have guide grooves 39 (shown only at the left holding part 33) on inner surfaces thereof. The guide grooves 39 are constituted by: an upper groove 39a and a lower groove 39b, two of which extend in a front-back direction; and two vertical grooves 39c formed at a front side of the grooves and extending vertically so as to connect to the upper groove 39a and the lower groove 39b.

When the mobile phone is assembled, the shaft parts 26 and 27 are inserted into the lower grooves 39b of the guide grooves 39 to thereby place the second cabinet 2 in the accommodation region R of the holding body 3, and then the projections 16 and 17 are inserted into the upper grooves 39a of the guide grooves 39 to thereby place the first cabinet in the accommodation region R of the holding body 3 above the second cabinet 2. Accordingly, the first cabinet 1 is guided by the upper grooves 39a so as to be slidable in a front-back direction. In addition, the second cabinet 2 is guided by the lower grooves 39b so as to be slidable in front-back direction. Further, when the second cabinet 2 moves forward and then the shaft parts 26 and 27 reach the vertical grooves 39c, the second cabinet 2 is guided by the vertical grooves 39c so as to be slidable in a vertical direction.

Figure 2:
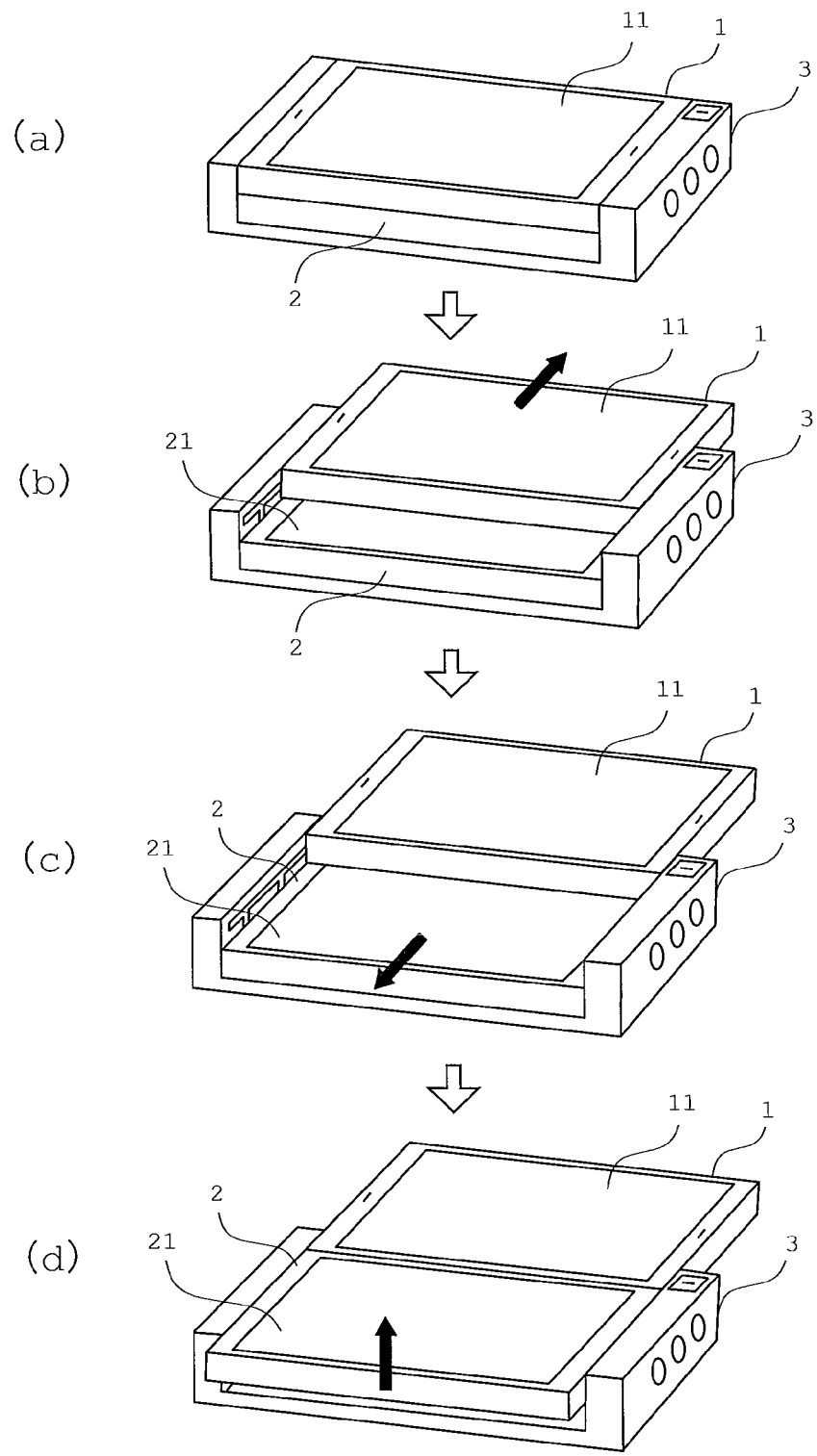
FIG. 2 is a diagram for describing a switching operation in the mobile phone of the embodiment from a single-screen state with a first display screen to a two-screen state with the first display screen and a second display screen.

FIG. 2 is a diagram for describing a switching operation in the mobile phone of the embodiment from a single-screen state with the first display screen 11 to a two-screen state with the first display screen 11 and the second display screen 21.

In an initial state as shown in FIG. 2 (*a*), the second cabinet 2 is hidden behind the first cabinet 1. Under this state, only the first display screen 11 is exposed to the outside. This state refers to "single-screen state." State switching is performed by a user's manual operation.

First, the user moves the first cabinet 1 backward as shown in FIG. 2 (*b*). Then, upon completion of backward movement of the first cabinet 1, the user draws out the second cabinet 2 forward as shown in FIG. 2 (*c*). By this draw-out operation, the second cabinet 2 moves to a position where the second cabinet 2 does not overlap the first cabinet 1 at all, that is, a position where the second cabinet 2 is situated in front of the first cabinet 1. Accordingly, the shaft parts 26 and 27 reach the vertical grooves 39c as stated above, and then the second cabinet 2 is pressed and raised by the coil spring 34. At that time, the magnet 14 and the magnet 23 attract each other to thereby exert a larger rising power. Accordingly, as shown in FIG. 2 (*d*), the first cabinet 1 and the second cabinet 2 are aligned so as to be attached to each other in a front-back direction and be flush with each other. The first display screen 11 and the second display screen 21 are integrated into one large-sized screen. This state refers to "two-screen state."

Figure 3:
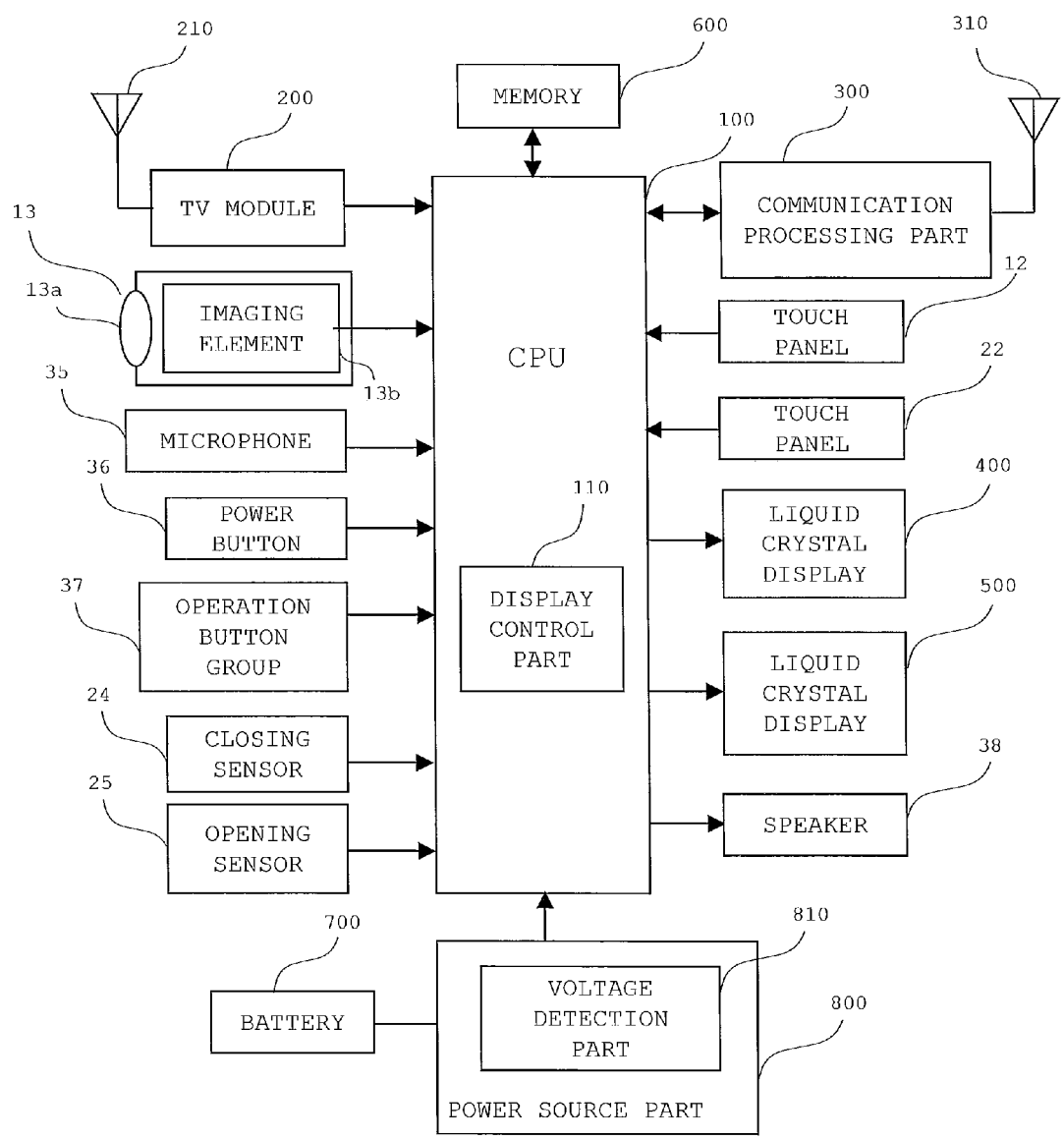
FIG. 3 is a block diagram showing a circuit configuration in the mobile phone of the embodiment.

FIG. 3 is a block diagram showing a circuit configuration of the mobile phone of this embodiment. In addition to the constitutional elements described above with reference to FIG. 1, the mobile phone also includes a CPU 100, a TV module 200, a communication processing part 300, liquid crystal displays 400 and 500, a memory 600, a battery 700, and a power source part 800.

The TV module 200 includes a TV tuner and the like, and converts radio waves such as digital terrestrial broadcast waves received via an antenna 210 into image signals, and sends the same to the CPU 100.

The camera module 13 is composed of an imaging lens 13a, an imaging element 13b, and the like. The imaging lens 13a forms an image of an object on the imaging element 13b. The imaging element 13b is formed by a CCD, for example, and generates an imaging signal in accordance with a captured image and sends the same to the CPU 100.

The microphone 35 converts an audio signal into an electric signal and sends the same to the CPU 100. The speaker 38 reproduces the audio signal from the CPU 100 in audio representation.

The communication processing part 300 converts audio signals, image signals, text signals and the like from the CPU 100 into radio signals, and transmits the same to a base station via an antenna 310. The communication processing part 300 also converts radio signals received via the antenna 310 into audio signals, image signals, text signals and the like, and sends the same to the CPU 100.

The liquid crystal display 400 includes a liquid crystal panel constituting the first display screen 11, a backlight device, and the like, and displays on an image on the first display screen 11 in accordance with a drive signal from the CPU 100. Similarly, the liquid crystal display 500 includes a liquid crystal panel constituting the second display screen 21, a backlight device, and the like, and displays an image on the second display screen 21 in accordance with a drive signal from the CPU 100.

The memory 600 stores image data shot by the camera module 13, image data captured from the outside via the communication processing part 300, text data (e-mail data) and the like, in predetermined file formats.

The battery 700 is intended to supply power to the CPU 100 and other components of the mobile phone, and is formed by a secondary battery. The battery 700 is connected to the power source part 800.

The power source part 800 converts a voltage of the battery 700 into voltages of magnitudes required for the components of the mobile phone, and supplies the same to the components. In addition, the power source part 800 charges the battery 700 by supplying the battery 700 with power supplied from an input of an external power source (not shown).

The power source part 800 has a voltage detection part 810. The voltage detection part 810 detects a voltage of the battery 700 and sends the same to the CPU 100.

The CPU 100 outputs control signals to the components such as the speaker 38 and the liquid crystal displays 400 and 500, in accordance with input signals from the components such as the touch panels 12 and 22, the operation button group 37, the microphone 35, and the imaging element 13b, to thereby perform communication processing and various mode operations (e-mail mode, Internet mode, television mode, camera mode, and the like). In addition, the CPU 100 determines a remaining level in the battery 700 in accordance with a voltage signal from the voltage detection part 810.

The CPU 100 includes a display control part 110. The display control part 110 produces images to be displayed on the liquid crystal displays 400 and 500, in a memory (not shown) as a working area prepared in the CPU 100, and outputs image signals (RGB signals) for displaying the produced images to the liquid crystal displays 400 and 500. In addition, the display control part 110 captures image data transferred from the imaging element 13b, image data stored in the memory 600, image data received via the communication processing part 300, and the like. Then, the display control part 110 generates image signals (RGB signals) from the captured image data, and outputs the generated image signals to the liquid crystal displays 400 and 500. Accordingly, the liquid crystal displays 400 and 500 show the images in accordance with the image signals.

Figure 4:
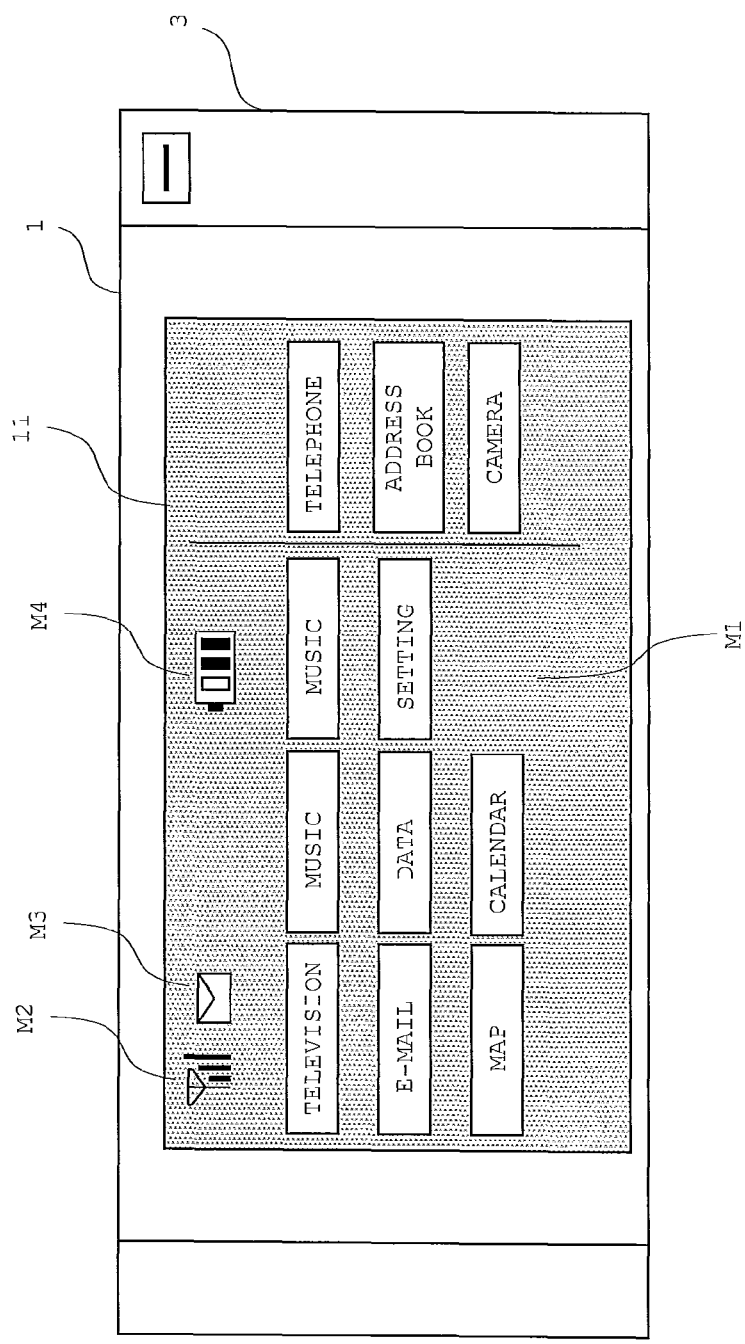
FIG. 4 is a diagram showing a display example in the mobile phone of the embodiment where an initial screen (mode selection screen) is displayed on the first display screen in the single-screen state.

When the mobile phone is in the single-screen state with the second cabinet 2 closed, an image is displayed on the first display screen 11. FIG. 4 is a diagram showing a display example of the mobile phone of the embodiment where the initial screen (mode selection screen) is displayed on the first display screen 11 in the single-screen state.

The first display screen 11 has at a central part thereof eleven mode keys M1 such as "television," "e-mail," and "map" as a main display. When the user presses a desired mode key M1 on the screen, the mode in accordance with the pressed mode key M1 is implemented. The first display screen 11 has at an upper part thereof a signal meter M2 indicative of a reception status, an e-mail mark M3 indicative of incoming e-mail, and a remaining battery level mark M4 indicative of a remaining battery level, as a sub display.

When the user presses the mode key M1 for "television" on the initial screen, for example, a television program is displayed on the first display screen 11. Meanwhile, when the user presses the mode key M1 for "e-mail" on the initial screen and then performs an operation for viewing the contents of incoming e-mail on the next screen, the contents of the e-mail are displayed on the first display screen 11.

In this embodiment, when the second cabinet 2 is drawn out to make a transition from the single-screen state to the two-screen state, it is possible to use the first display screen 11 and the second display screen 21 in the two-screen state so as to display a plurality of images in different orientations.

Figure 5:
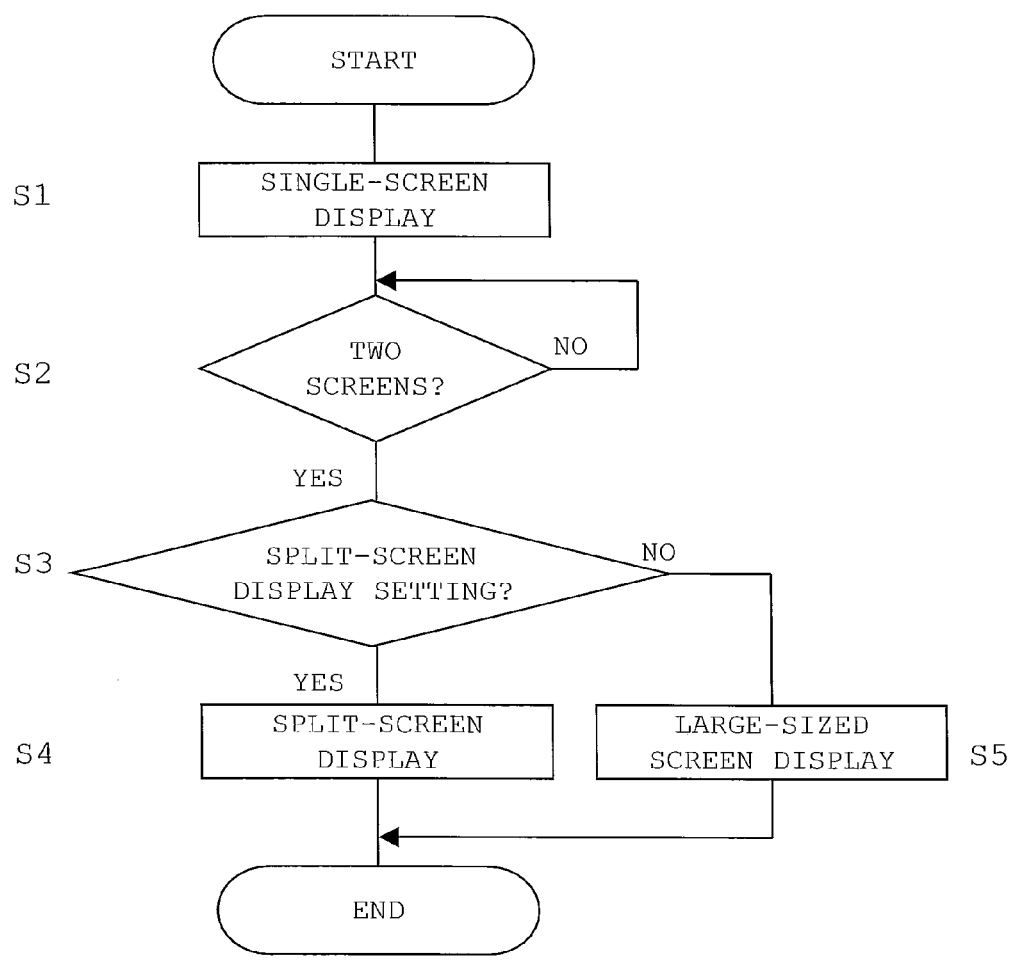
FIG. 5 is a flowchart for describing a screen display control in the mobile phone of the embodiment.
Figure 6:
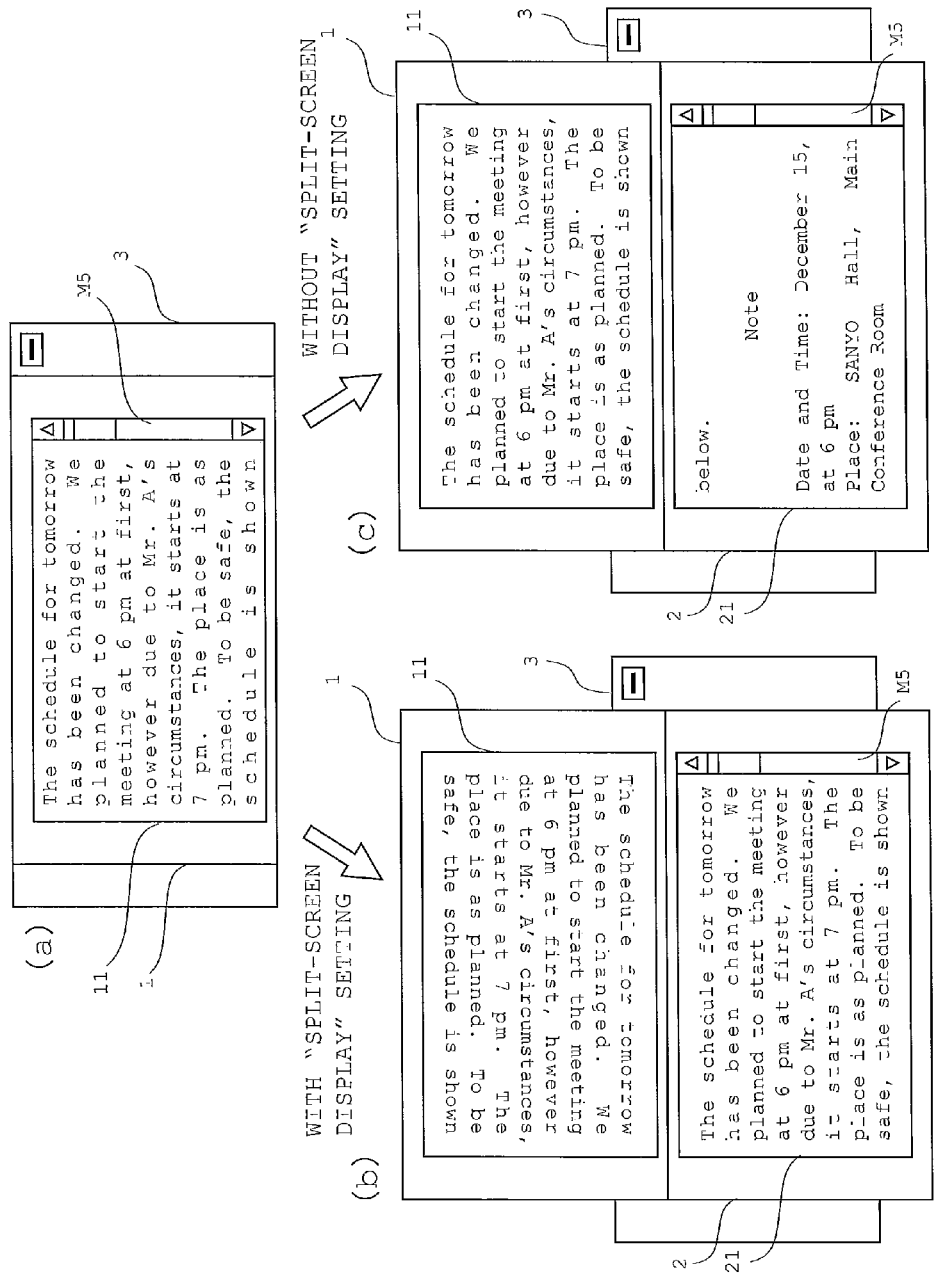
FIG. 6 is a diagram showing a screen display example in the mobile phone of the embodiment where the screen display control is exercised in an e-mail mode.

FIG. 5 is a flowchart for describing a screen display control in the mobile phone of this embodiment. FIG. 6 is a diagram showing a screen display example of the mobile phone of the embodiment where the screen display control is exercised in the e-mail mode.

First, when the second cabinet 2 is closed (the single-screen state), the display control part 110 sends an image signal to the liquid crystal display 400. Accordingly, a predetermined image (text, video pictures, or the like) is displayed on the first display screen 11 as shown in FIG. 6 (a) (S1). For example, the text of incoming e-mail is displayed on the first display screen 11. In addition, a scroll operation part M5 for scrolling text is displayed at a right end of the first display screen 11. The user can operate the scroll operation part M5 to display following text.

When the mobile phone enters the two-screen state by the user's drawing out the second cabinet 2, the opening sensor 25 inputs an ON signal to the CPU 100 as stated above. The CPU 100 determines whether the mobile phone has entered the two-screen state depending on the input of the ON signal (S2). The CPU 100 may be configured to determine that the mobile phone has entered the two-screen state depending on whether a signal from the closing sensor 24 becomes OFF, or may be configured to determine that the mobile phone has entered the two-screen state depending on whether there is no ON signal from the closing sensor 24 and there is an ON signal from the opening sensor 25.

If the CPU 100 determines that the mobile phone has entered the two-screen state (S2: YES), the CPU 100 then determines whether "split-screen display" is preset by the user (S3). Then, if the CPU 100 determines that "split-screen display" is preset (S3: YES), the display control part 110 sends an image signal to the liquid crystal display 400 and the liquid crystal display 500 in accordance with this determination. Accordingly, an already displayed image is displayed upside down on the first display screen 11 and the same image is displayed in a normal state (not upside down) on the second display screen 21 as shown in FIG. 6 (b) (S4). For example, e-mail text is displayed upside down on the first display screen 11, and the same e-mail text is displayed in the normal state (not upside down) on the second display screen 21. At that time, the scroll operation part M5 is displayed at a right end of the second display screen 21.

In contrast, if the CPU 100 determines that "split-screen display" is not set (S3:NO), the display control part 110 sends an image signal to the liquid crystal display 400 and the liquid crystal display 500 in accordance with this determination. Accordingly, one image is displayed on a large-sized screen into which the first display screen 11 and the second display screen 21 are integrated, as shown in FIG. 6 (c). For example, the same e-mail text as that in the single-screen state is displayed on the first display screen 11, and e-mail text continued from the first display screen 11 is displayed on the second display screen 21. At that time, the scroll operation part M5 is displayed on the second display screen 21. Alternatively, the scroll operation part M5 may be provided as one button of the operation button group 37, not provided on the display screen.

In the configuration of this embodiment stated above, when the mobile phone is in the two-screen state, an image is displayed upside down on the first display screen 11 and an image is displayed in the normal state on the second display screen 21. Therefore, it is possible to allow a person other than the user, for example, a person opposite to the user with the mobile phone between the two persons, to view the image (the contents of e-mail text or the like) in an easy manner, without the need to turn the mobile phone toward the opposite person or hand the mobile phone to the opposite person.

Further, since "split-screen display" is produced in accordance with an switching operation from the single-screen state to the two-screen state as stated above, it is unnecessary for the user to perform any additional operation for "split-screen display" at each switching to the two-screen state, thereby resulting in ease of operation.

Moreover, if "split-screen display" is not set, large-screen display is produced. This large-screen display makes it possible to display a great deal of information at a time or display an enlarged image.

Although the embodiment of the present invention is as described above, the present invention is not limited to this embodiment. In addition, the embodiment of the present invention may be appropriately modified in various manners within the scope of a technical idea recited in the claims. For example, the embodiment may be modified as described below.

Modified Example 1

In the foregoing embodiment, the same image is displayed on the first display screen 11 and the second display screen 21. However, the present invention is not limited to this display pattern, and may allow different images to be displayed on the two screens.

Figure 7:
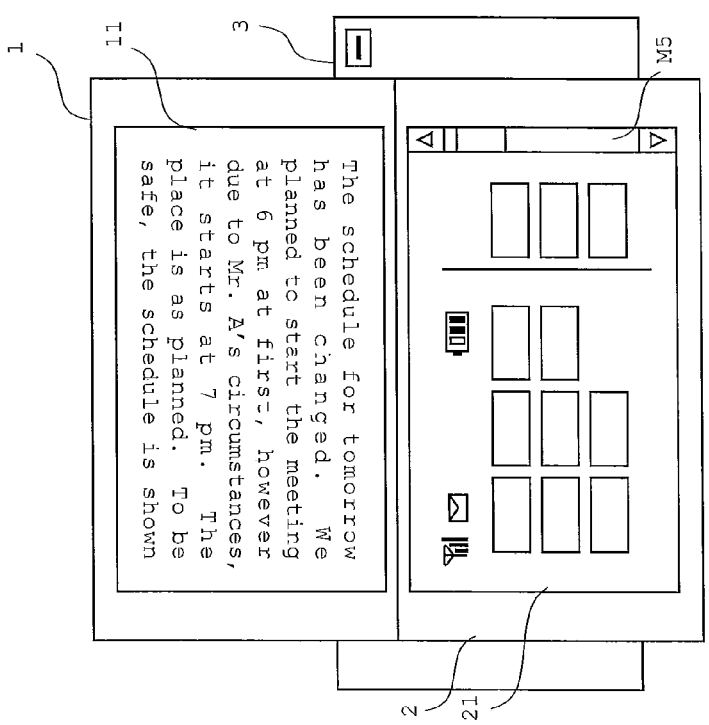
FIG. 7 is a diagram showing a screen display example in the mobile phone of the embodiment where different images are displayed in the two-screen state.

FIG. 7 is a diagram showing a screen display example of the mobile phone in this embodiment where different images are displayed in the two-screen state. In this display example, e-mail text is displayed upside down on the first display screen 11 in the two-screen state. This e-mail text is the same as e-mail text that was displayed in the single-screen state. Meanwhile, an image of mode selection screen is displayed in the normal state on the second display screen 21. If an operation for mode selection is performed on the second display screen 21, an image of the mode according to the selection is displayed on the second display screen 21. In such a configuration, the user can allow an opposite person to check the contents of e-mail (image) and can display and view another image for himself/herself.

Modified Example 2

In the foregoing embodiment, two images are displayed in different orientations on the first display screen 11 and the second display screen 21. However, the present invention is not limited to this display pattern, and may allow three or more images to be displayed in different orientations.

Figure 8:
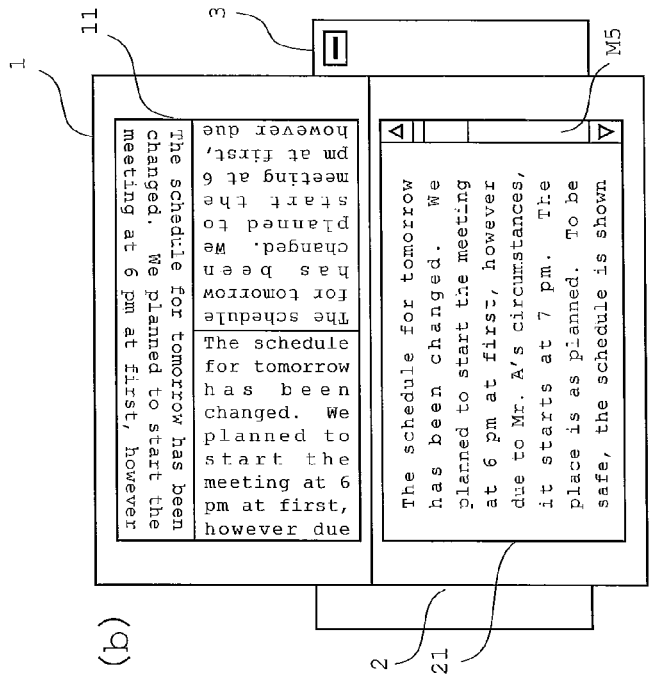
FIG. 8 is a diagram showing a screen display example in the mobile phone of the embodiment where three or more images are displayed in the two-screen state.
Figure 8:
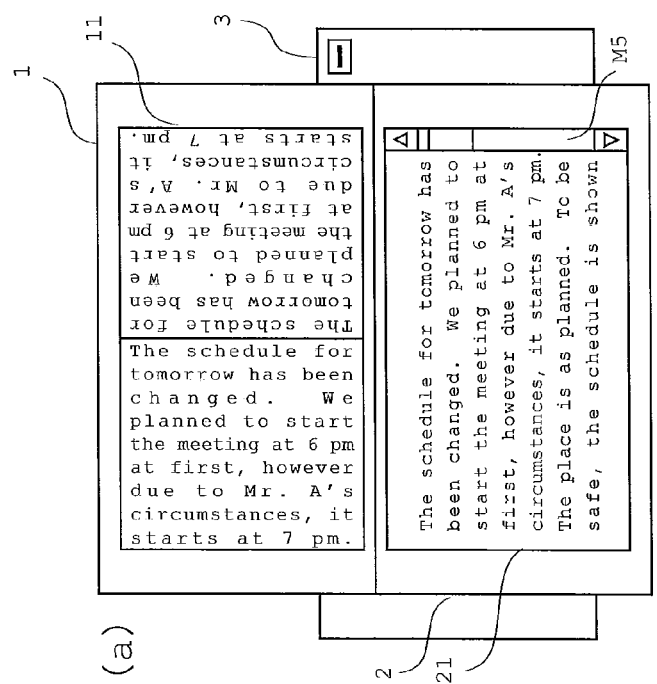

FIG. 8 is a diagram showing screen display examples of the mobile phone in this embodiment where three or more images are displayed in the two-screen state. In the display example of FIG. 8 (a), the first display screen 11 is split into right and left portions in the two-screen state, and e-mail text (image) is displayed on each of the split screens (hereinafter, referred to as "sub screens"). At that time, the text is displayed sideways with the right side down on the right sub screen, and the text is displayed sideways with the left side down on the left sub screen. In such a configuration, the contents of e-mail can be viewed in the two orientations, allowing three persons (including the user) to view the contents of e-mail.

In the display example of FIG. 8 (b), the first display screen 11 is split into three in the two-screen state so that e-mail text (image) is displayed on each of three sub screens. Specifically, the text is displayed sideways on the right and left sub screens as in the case of FIG. 8 (a), and the text is displayed upside down on the rear sub screen as in the case of FIG. 7. In such a configuration, the contents of e-mail can be viewed in three orientations, allowing four persons (including the user) to check the contents of e-mail. Alternatively, if four images are displayed as in this display example, both the first display screen 11 and the second display screen 21 may be split into two.

In a configuration where the first display screen 11 is split to display text on the sub screens as in the display examples of FIG. 8, each of the sub screens is reduced in display region and therefore becomes capable of displaying a decreased number of characters. Accordingly, the full text displayed on the second display screen 21 (hereinafter, referred to "main screen" with respect to the sub screen) cannot be displayed on the sub screens at a time.

In such a configuration, therefore, there is a possibility that the main screen may be scrolled and moved on to following text before persons viewing the sub screens read completely the full text on the sub screen that is displayed on the main screen. In order to solve such a problem, first and second scroll controls are exercised as described below.

Figure 9:
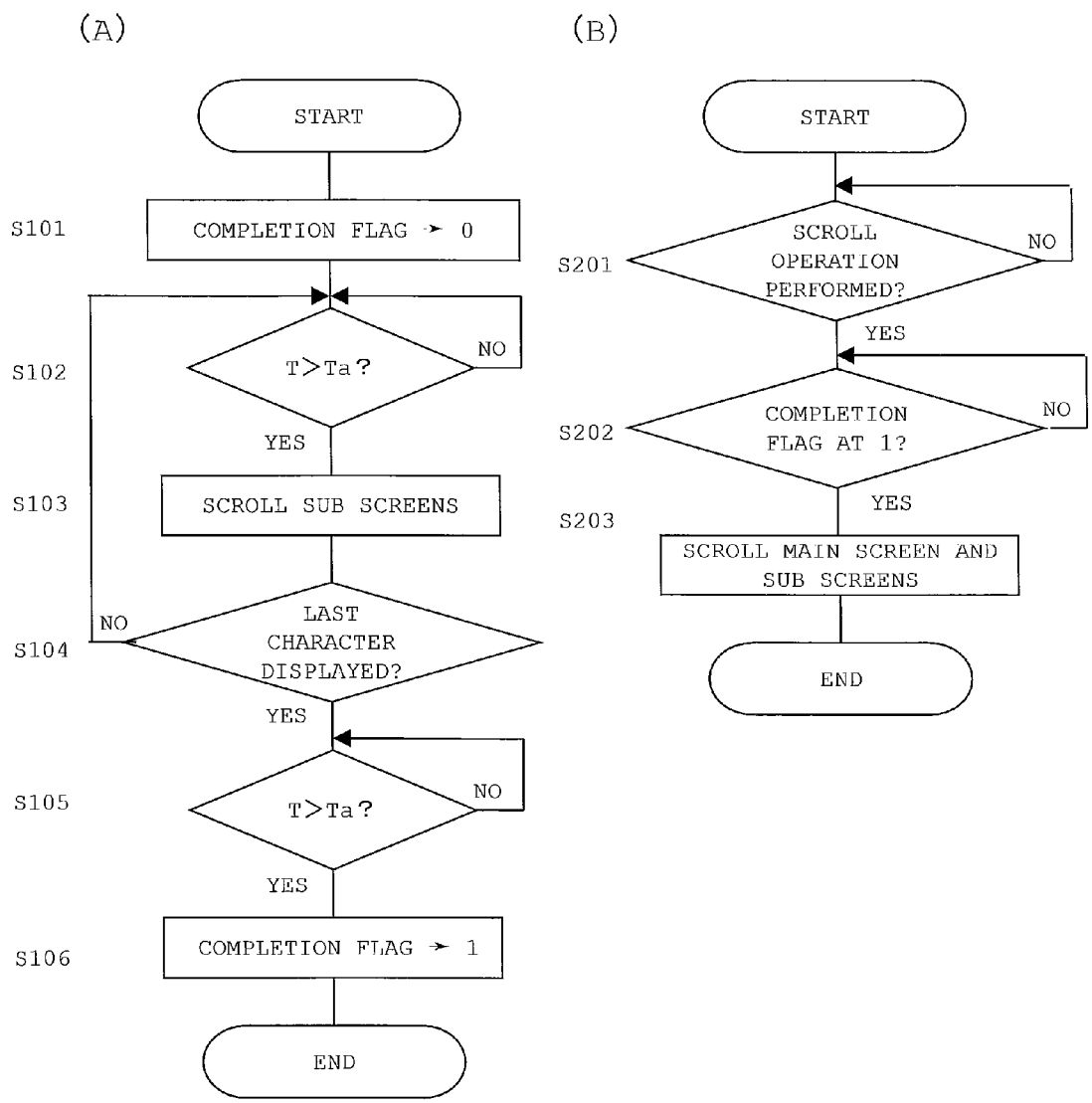
FIG. 9 is a flowchart for describing first and second scroll controls in the mobile phone of the embodiment.
Figure 10:
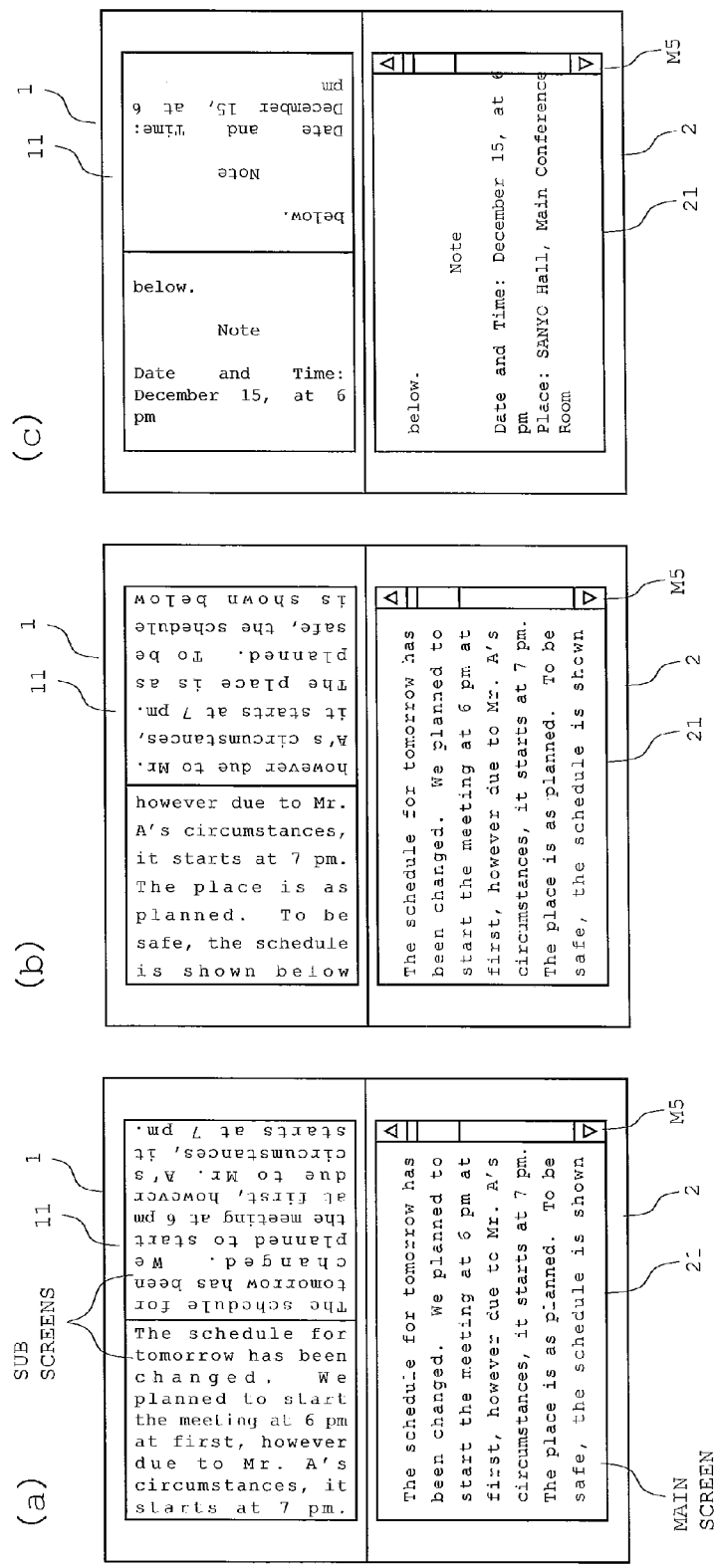
FIG. 10 is a diagram showing a screen display example in the mobile phone of the embodiment where first and second scroll actions are performed.

FIG. 9 shows flowcharts for describing the first and second scroll controls in the mobile phone of this embodiment: FIG. 9 (a) is a flowchart for the first scroll control; and FIG. 9 (b) is a flowchart for the second scroll control. In addition, FIG. 10 shows a screen display example of the mobile phone in this embodiment where the first and second scroll actions are performed.

When first e-mail text is displayed on the sub screens or following e-mail text is displayed on the sub screens in accordance with a scroll operation performed on the main screen, the first scroll control is started as shown in FIG. 9 (a).

The CPU 100 resets a completion flag to "0" (S101). The completion flag is supplied in the CPU 100, and is set to "1" upon completion of a scroll operation on the sub screens.

Next, the CPU 100 determines whether an elapsed time T since display of the e-mail text has exceeded a prescribed time Ta (S102). The elapsed time T is measured by a timer in the CPU 100. The prescribed time T is a time that is considered to be necessary for reading e-mail text displayed on the sub screens, and an appropriate period of time is preset as the prescribed time. Until the prescribed time Ta is exceeded, the first text is continuously displayed on the sub screens of the first display screen, as shown in FIG. 10 (a).

If the prescribed time Ta has been elapsed and the CPU 100 determines that the elapsed time T has exceeded the prescribed time Ta (S102: YES), the display control part 110 sends an image signal to the liquid crystal display 400 in accordance with this determination. Accordingly, the sub screens of the first display screen 11 are scrolled to display the following e-mail text as shown in FIG. 10 (b).

Next, the CPU 100 determines whether up to a last character of the text on the main screen is also displayed on the sub screens. If the screen is split into two as in the configuration of FIG. 8 (*a*), the full text on the main screen can be displayed on the sub screens by two display operations. Therefore, in this case, the CPU 100 determines that up to the last character has been displayed (S104: YES). Subsequently, the CPU 100 determines whether the elapsed time T has exceeded the prescribed time Ta as at S102 (S105). If the CPU 100 determines that the prescribed time Ta has been exceeded (S105: YES), the CPU 100 sets the completion flag to "1" (S106). This completes the first scroll control.

The second scroll control is started in parallel with the first scroll action. The CPU 100 determines whether the user has operated the scroll operation part M5 on the second display screen 21 (S201). Then, when the CPU 100 determines that the scroll operation has been performed, the CPU 100 determines whether the completion flag is set to "1" in the first scroll control (S202).

If the first scroll control is completed as stated above, the completion flag is set to "1." In this case, it can be recognized that the full text displayed on the main screen has been displayed on the sub screens and already viewed by the opposite person(s).

If the CPU 100 determines that the completion flag is set to "1" (S202: YES), the display control part 110 sends an image signal to the liquid crystal display 400 and the liquid crystal display 500. Accordingly, the main screen and the sub screens are scrolled, and then the following e-mail text is displayed on each of the screens as shown in FIG. 10 (*c*) (S203).

Meanwhile, if the first scroll control is not completed when the second display screen 21 is scrolled, the completion flag remains at "0." In this case, it can be recognized that all of the text on the main screen has not been displayed on the sub screens or has not been read by the opposite person(s).

Accordingly, if the CPU 100 determines that the completion flag is not set to "1" (S202: NO), the CPU 100 waits until the first scroll control is completed and the completion flag is set to "1." Then, upon completion of the first scroll control (S202: YES), the CPU 100 executes step 5203 to display the following e-mail text on the main screen and the sub screens.

In such a manner as stated above, the first and second scroll controls are also performed on the display of the following e-mail text.

If the first display screen 11 is split into three as in the configuration of FIG. 8 (*b*), a decreased number of characters can be displayed on the sub screens as compared with the case of the two-split screen. Accordingly, all of the text on the main screen cannot be displayed on the sub screens in two operations. In this case, therefore, steps S102 to 5104 are repeated twice.

In the case of FIG. 8 (*b*), the number of displayed characters is different between the right and left sub screens and the rear sub screen. Therefore, the first scroll control is executed separately on the right and left sub screens and the rear sub screen. In addition, the CPU 100 determines at step S202 of the second scroll control whether both the completion flag for the first scroll control on the right and left sub screens and the completion flag for the first scroll control on the rear sub screen are set to "1." Then, only if the CPU 100 determines that both the completion flags are set to "1," the CPU 100 moves the process to step S203 to display the following e-mail text on the main screen and the three sub screens.

In such a configuration, when the scroll operation (operation to advance the screen) is performed, the following text (image) can be displayed on both the main screen and the sub screens only after all of the text (all images) displayed on the main screen are also displayed on the sub screens. Accordingly, even if all of the text displayed on the main screen cannot be displayed on the sub screens at a time, it is possible to prevent that, when the scroll operation is performed on the main screen before all of the text on the main screen is displayed on the sub screens, the sub screens switch to text following all of the text on the main screen. This allows the operator and the other persons to view the same part of the text.

In the foregoing configuration, the scroll operation is started after all of the text is displayed on the sub screens to thereby synchronize a screen advancing speed between the main screen and the sub screens. Alternatively, display of the main screen and display of the sub screens may be synchronized by lowering a scroll speed on the main screen as compared with a scroll speed on the sub screens.

In addition, the foregoing configuration is based on the premise that only the owner operates the mobile phone, and is useful for the case where the scroll operation part M5 is provided on the main screen. However, if person(s) other than the owner are allowed to perform certain operations, the sub screens each may be provided with a scroll operation part so that the sub screens can be independently scrolled. In such a configuration, the person(s) can surely view the contents on the sub screens regardless of a scroll operation on the main screen. Further, in such a configuration, the text currently displayed on the main screen may be displayed in different color (s) on the sub screens. This allows the person (s) viewing the text on the sub screen(s) to easily understand which part of the text is currently viewed on the main screen.

Modified Example 3

In the foregoing embodiment, if "split-screen display" is preset by the user, screen display patterns are switched in conjunction with a switching operation to the two-screen state (for example, an image is displayed upside down on the first display screen 11). However, the present invention is not limited to this configuration, and may allow image display patterns to be switched by an alternative triggering action as described below.

Figure 11:
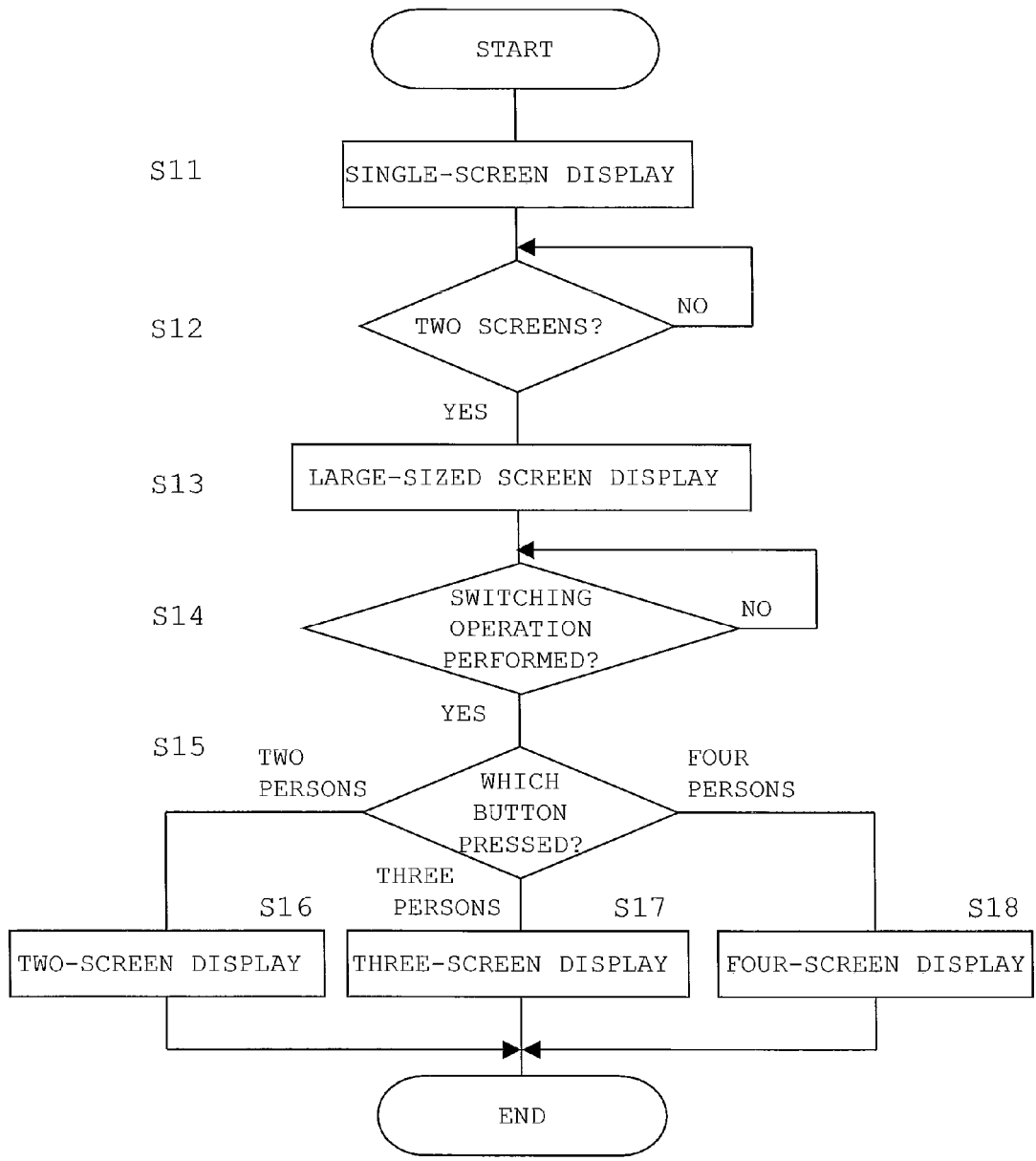
FIG. 11 is a flowchart for describing another screen display control in the mobile phone of the embodiment.
Figure 12:
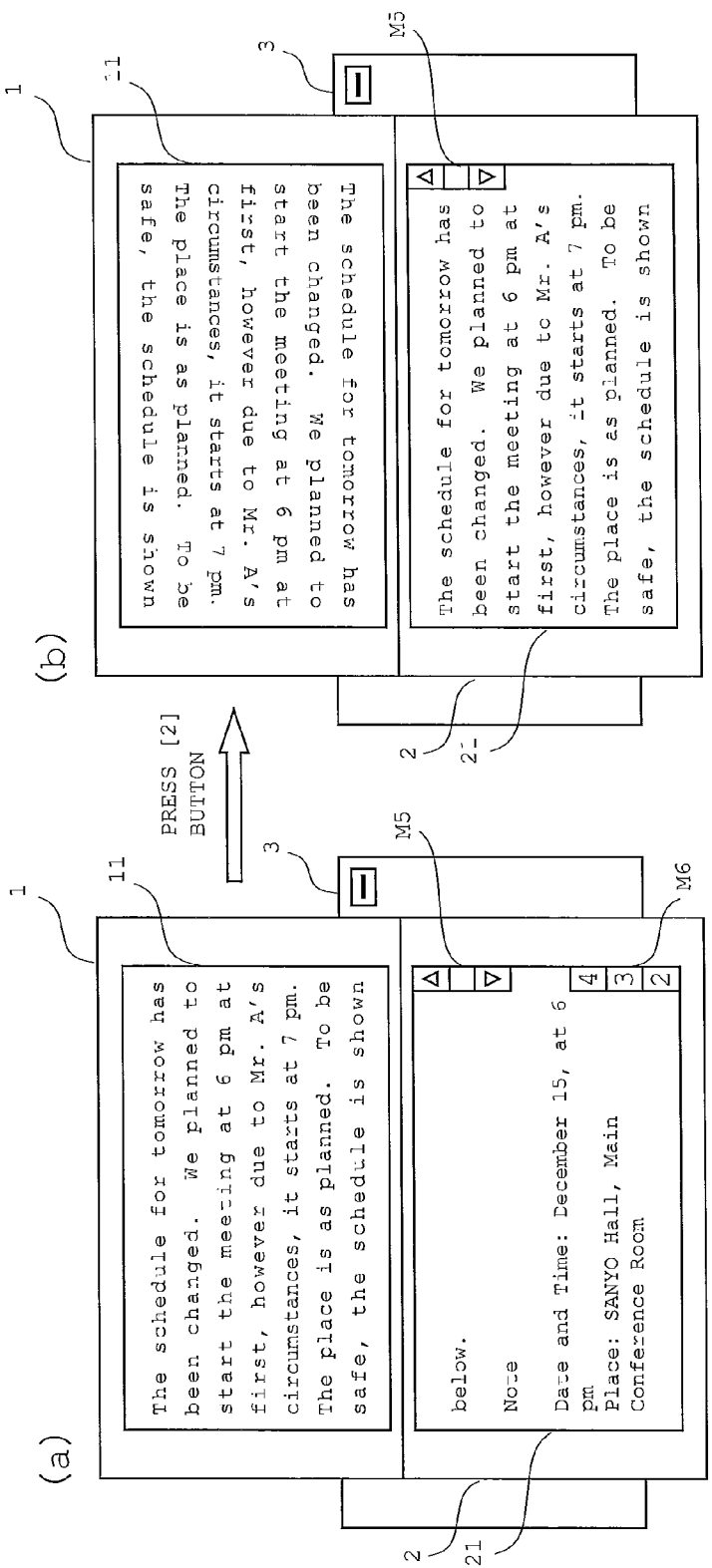
FIG. 12 is a diagram showing a screen display example in the mobile phone of the embodiment where another screen display control is exercised in the e-mail mode.

FIG. 11 is a flowchart for describing another screen display control in the mobile phone of this embodiment. FIG. 12 is a diagram showing a screen display example of the mobile phone of this embodiment where another screen display control is exercised in the e-mail mode.

First, in the single-screen state, the display control part 110 sends an image signal to the liquid crystal display 400 to thereby display a predetermined image (text, video pictures, or the like) on the first display screen 11 (S11). When the mobile phone is switched to the two-screen state by the user's operation, the CPU 100 determines that the mobile phone has entered the two-screen state as stated above (S12: YES). Accordingly, the display control part 110 sends an image signal to the liquid crystal display 400 and the liquid crystal display 500 to thereby display one image on a large-sized screen formed by the first display screen 11 and the second display screen 21 (S13). For example, e-mail text is displayed by a number of lines in accordance with the large-sized screen.

At that time, in addition to the above-mentioned scroll operation part M5, a switching operation part M6 is displayed on the second display screen 21. The switching operation part M6 includes three selection buttons of "2," "3," and "4" for setting the number of viewers. Alternatively, the scroll operation part M5 and the switching operation part M6 may be provided as buttons of the operation button group 37, not provided on the display screen.

Next, the CPU 100 determines whether the switching operation part M6 has been operated (S14). If the CPU 100 determines that the switching operation part M6 has been operated (S14: YES), the CPU 100 determines which of the selection buttons has been pressed (S15).

If the CPU 100 determines that the "2" selection key for two persons has been pressed (S15: two persons), the display control part 110 sends an image signal to the liquid crystal display 400 and the liquid crystal display 500. Accordingly, the foregoing image (e-mail text) is displayed upside down on the first display screen 11, and the image (e-mail text) already displayed on the first display screen 11 is displayed in a normal state on the second display screen 21, as shown in FIG. 12 (b) (S16).

If the CPU 100 determines at step S15 that the "3" selection key for three persons has been pressed, screen display is provided on the total three screens where the first display screen 11 is split into two, as in the screen display of FIG. 8 (a) described above (S17). Meanwhile, if the CPU 100 determines at step S15 that the "4" selection key for four persons has been pressed, screen display is provided on the total four screens where the first display screen 11 is split into three, as in the screen display of FIG. 8 (b).

In this configuration, screen display can be switched when "split-screen display" becomes necessary. In addition, a display pattern can be selected in accordance with the number of viewers, which allows persons other than the user to view an image in an easier manner.

Modified Example 4

The screen display control in this embodiment can be applied to modes other than the e-mail mode, for example, the television mode.

Figure 13:
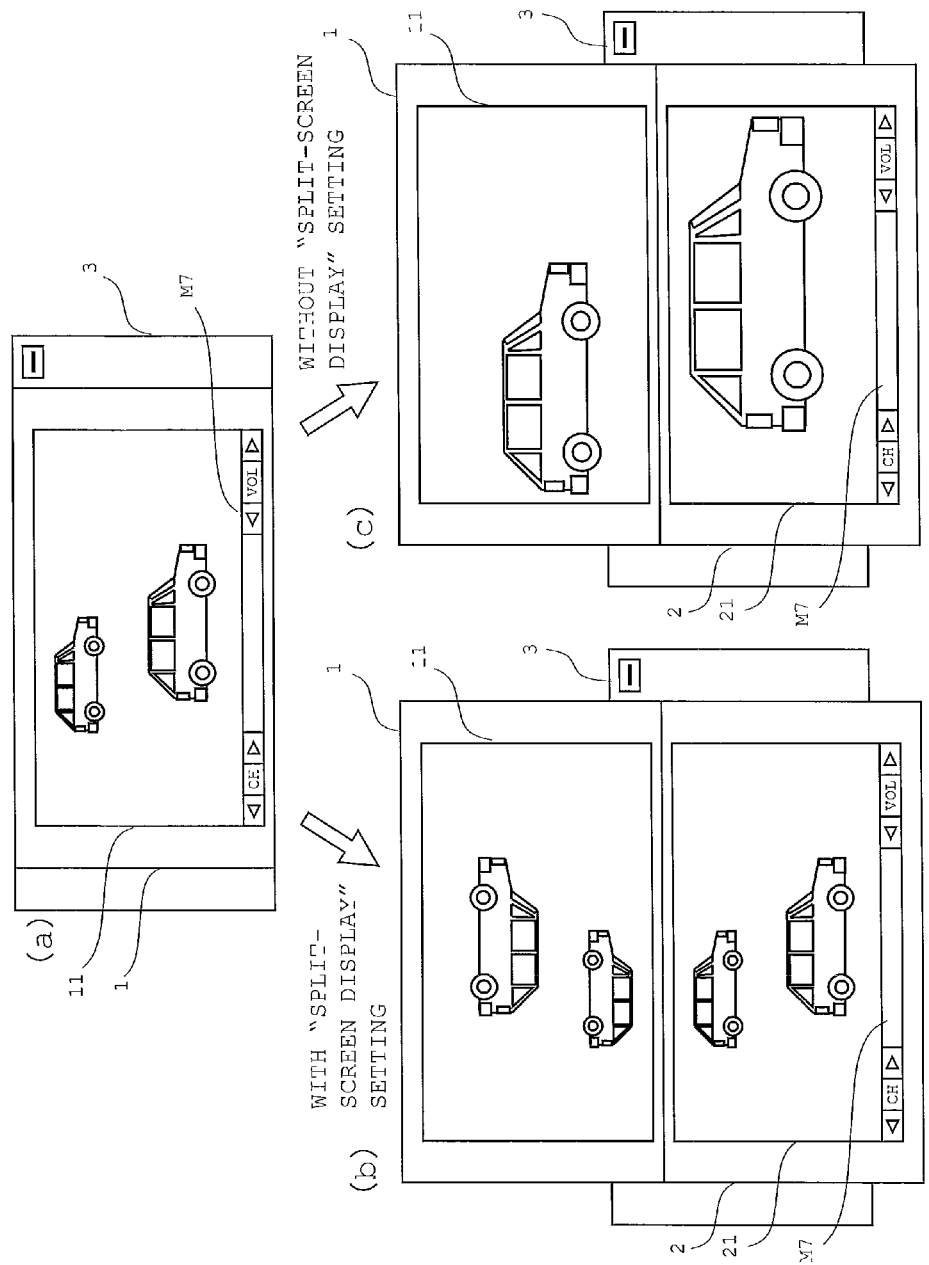
FIG. 13 is a diagram showing a screen display example in the mobile phone of the embodiment where the screen display control is applied to a television mode.

FIG. 13 is a diagram showing a screen display example of the mobile phone in this embodiment where the screen display control is applied to the television mode. As shown in FIG. 13 (a), a television picture is displayed on the first display screen 11 in the single-screen state. In addition, a television operation part M7 is displayed at a lower end of the screen for channel switching and volume adjustment. Alternatively, the television operation part M7 may be provided as a button of the operation button group 37, not provided on the display screen.

When the second cabinet 2 is drawn out by the user to enter the mobile phone in the two-screen state, if "split-screen display" is set by the user, television pictures are displayed upside down on the first display screen 11 as shown in FIG. 13 (b). In addition, the television pictures in the normal state and the television operation part M6 are displayed on the second display screen 21.

Meanwhile, if "split-screen display" is not set by the user, enlarged television pictures are displayed on a large-sized screen formed by the first display screen 11 and the second display screen 21, as shown in FIG. 13 (c). In addition, the television operation part M6 is displayed on the second display screen 21.

In such a manner, when pictures are displayed in opposite orientations on the two display screens in the television mode, opposite persons can enjoy the pictures at the same time.

The foregoing advantage can also be provided if the foregoing screen display control is applied to any of modes for displaying movies and game pictures other than the television mode.

Modified Example 5

Figure 14:
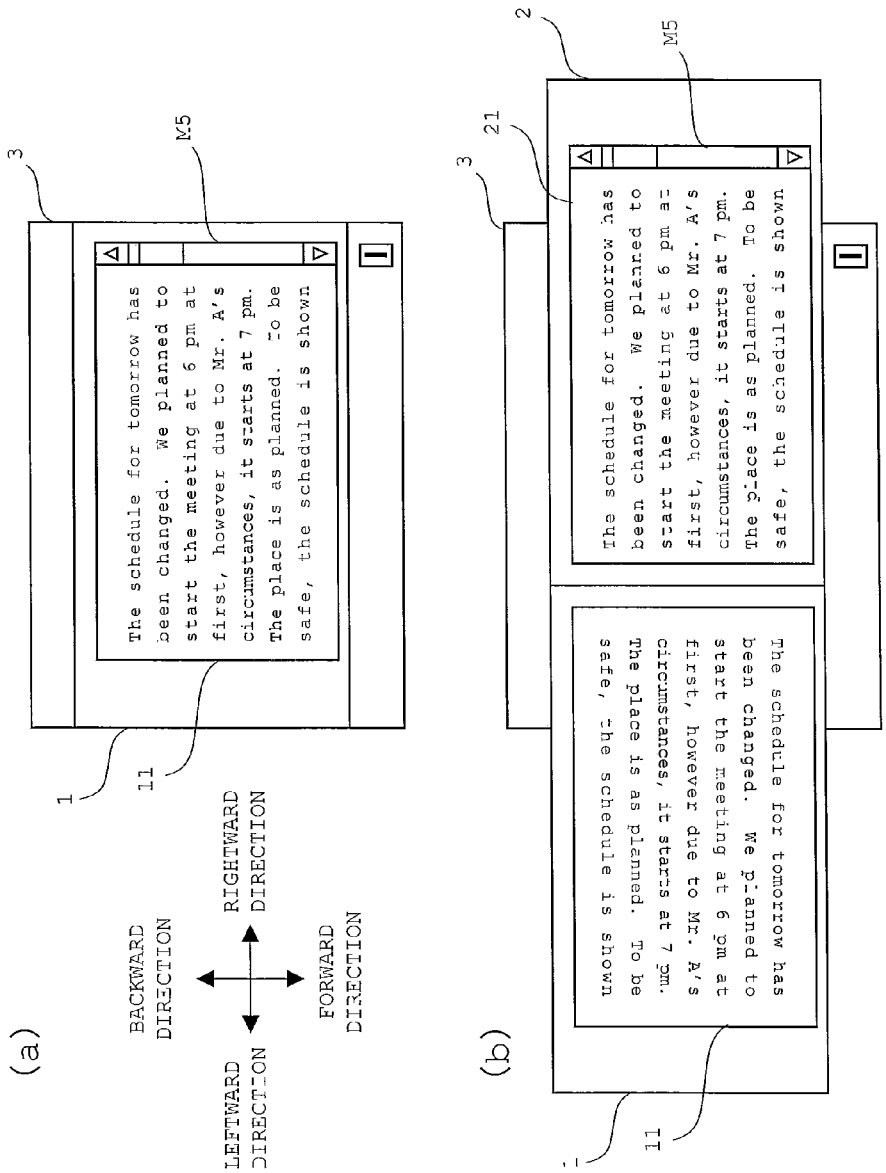
FIG. 14 is a diagram showing another configuration of the mobile phone of the embodiment where the first display screen and the second display screen are aligned horizontally in the two-screen state.

In the foregoing embodiment, the first cabinet 1 and the second cabinet 2 are aligned vertically in the two-screen state. Alternatively, the first cabinet 1 and the second cabinet 2 may be aligned horizontally as shown in FIG. 14. In this case, the first cabinet 1 and the second cabinet 2 are held at front and back sides by the holding body 3. Then, when the first cabinet 1 moves to the left and the second cabinet 2 moves to the right, the two cabinets are aligned horizontally.

In the single-screen state as shown in FIG. 14 (a), e-mail text (image) is displayed in the normal state on the first display screen 11. If "split-screen display" is set by the user, when the mobile phone enters the two-screen state as shown in FIG. 14 (b), the foregoing e-mail text (image) is displayed upside down on the first display screen 11, and the foregoing e-mail text (image) is displayed in the normal state on the second display screen 21.

Screen displays in the two-screen state may also be as shown in FIGS. 15 (a) and (b). In the screen display example shown in FIG. 15 (a), when the mobile phone enters the two-screen state, e-mail text (image) is displayed sideways with the left side down on the first display screen 11, and is displayed sideways with the right side down on the second display screen 21. Additionally, in the screen display example shown in FIG. 15 (b), when the mobile phone enters the two-screen state, e-mail text (image) is displayed in the normal state on a lower half of the first display screen 11 and on a lower half of the second display screen 21. Meanwhile, the e-mail text (image) is displayed upside down on an upper half of the first display screen 11 and on an upper half of the second display screen 21. In addition, a horizontal line M8 for dividing a screen is displayed at centers of the display screens 11 and 21.

Alternatively, screen displays shown in FIG. 14 (b), FIGS. 15 (a) and 15 (b) may be switched by the user's operation.

Modified Example 6

In the foregoing embodiment, if "two-split display" is set as shown in FIG. 6 (b), an image is displayed upside down on the first display screen 11. Alternatively, the orientation of the first display screen 11 may be switched by the user's operation. FIG. 16 shows a screen display example in such a configuration.

As shown in FIG. 16 (a), the second display screen 21 has an orientation switching button M9. When the orientation switching button M9 is pressed in the state of FIG. 16 (a), e-mail text (image) is switched in such a manner as to be displayed sideways with the right side down as shown in FIG. 16 (b). If the orientation switching button M9 is further pressed in the state of FIG. 16 (b), the e-mail text (image) is switched in such a manner as to be displayed sideways with the left side down as shown in FIG. 16 (c). If the orientation switching button M9 is pressed in the state of FIG. 16 (c), the e-mail text (image) returns to the state of FIG. 16 (a).

In such a configuration, it is possible to switch the orientation of an image in accordance with the position of the opposite person(s), thereby resulting in further increased convenience.

Another Example

In the foregoing embodiment, an image is displayed upside down on the first display screen 11 because the second display screen 21 moves forward (toward the user) and the first display screen moves backward (toward the opposite person).

Alternatively, an image may be displayed upside down on the second display screen 21 in a configuration where the first display screen 11 moves forward and the second display screen moves backward. That is, it is only needed that an image is displayed on a display screen directed to the opposite person (s) in such a manner as to be upside down with respect to the user.

Besides, the embodiments of the present invention may be appropriately modified in various manners within the scope of a technical idea recited in the claims.

What is claimed is:

1. An information processing device, comprising:
a first display unit having a first display screen;
a second display unit having a second display screen;
a display control part for controlling displays on the first display unit and the second display unit; and
a switch mechanism part for switching layouts of the first display unit and the second display unit between a first screen state in which only the first display screen is exposed to the outside and a second screen state in which both the first display screen and the second display screen are exposed to the outside,
wherein the display control part includes a control process that, in response to a switching operation from the first screen state to the second screen state, displays first data in a first orientation on the first display screen and displays second data in a second orientation on the second display screen, wherein the second orientation is different than the first orientation.

2. The information processing device according to claim 1, wherein displaying first data on the first display screen in the first orientation comprises changing an orientation of displayed data on the first display screen to the first orientation.

3. The information processing device according to claim 1, wherein the display control part executes a control process to change an orientation of the displayed data on one or more of the first display screen and second display screen in accordance with a switching operation from the outside in the second screen state.

4. The information processing device according to claim 1, wherein the display control part allows data from the same information source to be displayed in different orientations on a plurality of display regions in the second screen state, and when an operation for advancing the displayed data is input in this display state, the display control part controls the first display unit and the second display unit so as to synchronize data advancement between the display regions.

5. The information processing device according to claim 4, wherein the display control part synchronizes data advancement between the display regions by changing scroll speeds on the display regions.

6. The information processing device according to claim 4, wherein the display control part controls the first display unit and the second display unit in such a manner that:
until an end of a main data displayed on the largest display region is also displayed on all the other display regions, data advancement on the largest display region is stopped and data advancement on the other display regions is sequentially performed up to the end of the main data; and
after the end of the main data is displayed on all the other display regions, data following the main data is displayed on the display regions.

7. The information processing device according to claim 1, wherein the first orientation is upside down with respect to the second orientation.

8. The information processing device according to claim 1, wherein the first data and the second data are different.

9. The information processing device according to claim 1, wherein the first data and the second data are the same.

10. The information processing device according to claim 9, wherein advancement of the first data and the second data is synchronized.

11. The information processing device according to claim 10, wherein the advancement comprises a scroll operation on either the first data or the second data.

12. The information processing device according to claim 11, wherein a scroll operation for one of the first data and the second data is not performed on the other one of the first data and the second data until a prescribed time has elapsed from when the other one of the first data and the second data was displayed.

13. The information processing device according to claim 1, wherein the control process displays the first data on the first display screen in each of two or more sub-screens of the first display screen, wherein the first data displayed in each of the two or more sub-screens is displayed in a different orientation than the first data displayed in the other ones of the two or more sub-screens.

14. The information processing device according to claim 1, wherein the control process displays the second data on the second display screen in each of two or more sub-screens of the second display screen, wherein the second data displayed in each of the two or more sub-screens is displayed in a different orientation than the second data displayed in the other ones of the two or more sub-screens.

15. The information processing device according to claim 1,
wherein the control process displays the first data on the first display screen in each of two or more first sub-screens of the first display screen, wherein the first data displayed in each of the two or more first sub-screens is displayed in a different orientation than the first data displayed in the other ones of the two or more first sub-screens, and
wherein the control process displays the second data on the second display screen in each of two or more second sub-screens of the second display screen, wherein the second data displayed in each of the two or more second sub-screens is displayed in a different orientation than the second data displayed in the other ones of the two or more second sub-screens.

16. The information processing device according to claim 1, wherein the first data and the second data comprise one or more of text, an image, and a video.

17. An information processing device comprising a display control means for controlling display of images on a first display unit having a first display screen and on a second display unit having a second display screen, wherein, in response to the information processing device making a transition from a first screen state in which only the first display screen is exposed to the outside to a second screen state in which both the first display screen and the second display screen are exposed to the outside, the display control means displays first data in a first orientation on the first display screen and displays second data in a second orientation on the second display screen, wherein the second orientation is different than the first orientation.

18. An information processing device comprising a display control means for controlling display of images on a first display unit having a first display screen and on a second display unit having a second display screen, wherein, in response to the information processing device making a transition from a first screen state in which only the first display screen is exposed to the outside to a second screen state in which both the first display screen and the second display screen are exposed to the outside, the display control means displays data, which was displayed in a first orientation on the first display screen prior to the transition, on the second display screen, in a second orientation that is different from the first orientations.

* * * * *